May 5, 1970 W. R. TURNER 3,510,833
FREQUENCY CONVERSION IMAGING SYSTEM
Filed Jan. 9, 1967
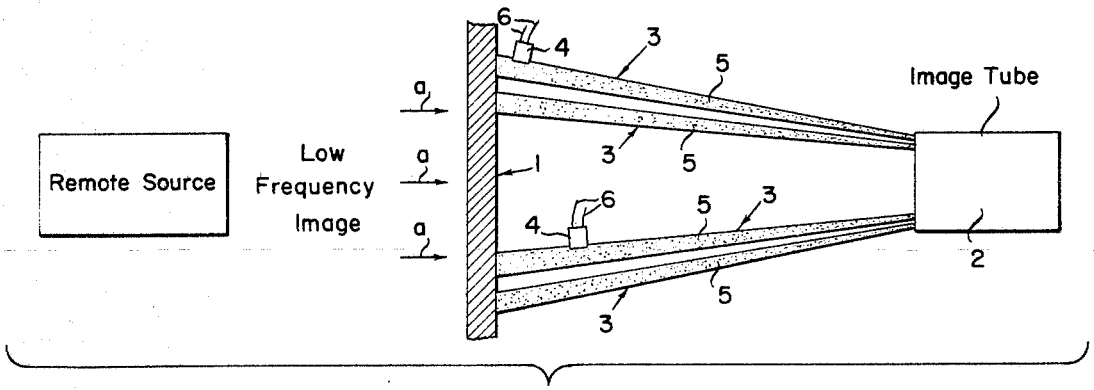
*fig. 1*
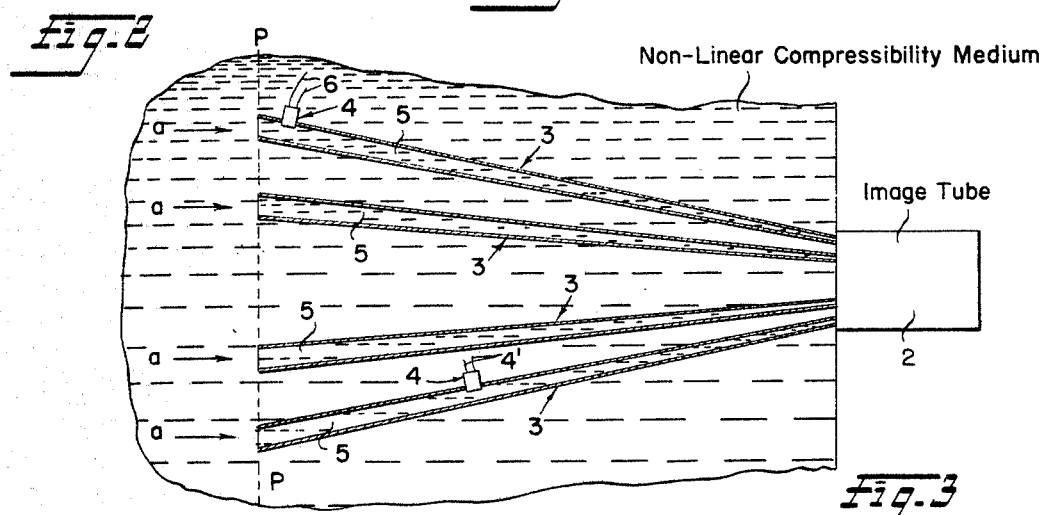
*fig. 2*
*fig. 3*
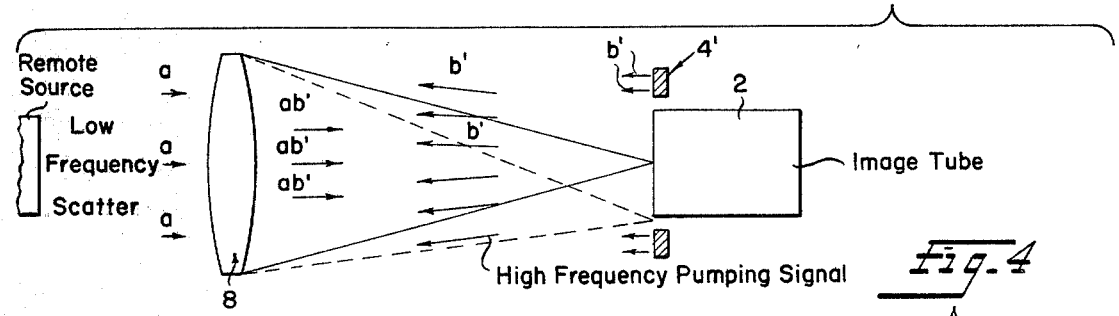
*fig. 4*
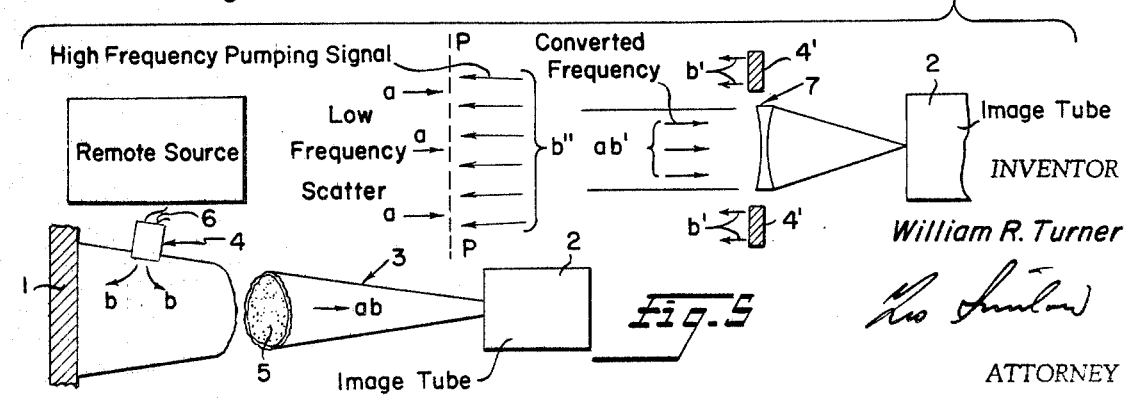
*fig. 5*
INVENTOR
William R. Turner
ATTORNEY ical or piezoceramic image conversion plates which are limited in diameter by factors of physical strength and material availability, and further because resolution is a function of the diameter to wavelength ratio. Attenuation of ultrasonic waves in a liquid such as water increases as the square of the signal frequency. Consequently, the penetration distance at the high frequency suitable for high resolution image detection is limited. This invention provides the advantage that a low frequency signal of high penetration distance can be converted to a high frequency image suitable for detection by known high resolution image converters.

United States Patent Office 3,510,833
Patented May 5, 1970

3,510,833
FREQUENCY CONVERSION IMAGING SYSTEM
William R. Turner, Chillum, Md., assignor to Vitro Corporation of America, New York, N.Y., a corporation of Delaware
Filed Jan. 9, 1967, Ser. No. 607,946
Int. Cl. G01v 1/00; H04b 13/00
U.S. Cl. 340—13
16 Claims

ABSTRACT OF THE DISCLOSURE

A communication or signal receptor system and method employing frequency conversion principle in a non-linear compressibility medium, in which low frequency variable acoustic energy, unsuitable by reason of its long wavelength for effective detection by electronic means, in sensors of limited size, is mixed with a steady high frequency ultrasonic signal generated in proximity of a receptor to provide a modulated, high frequency signal acceptable by the receptor. The principle of the system may be broadly defined as parametric frequency conversion within a vibrational transmission medium, fluid, gaseous or solid.

---

The object of this invention is to provide a sonic communication system in which weak, substantially undetectable, low frequency sonic signals are parametrically modified within the sonic transmitting medium to produce high frequency signals of sufficient amplitude readily accepted by an electronic receiver.

A further object of the invention is to attain the above high frequency signals by beating said low frequency signal with a steady high frequency ultrasonic signal generated in proximity of the receiver.

More specifically, it is the object of this invention to provide a signal intermixing zone in which the steady high frequency signal is intermixed with a variable, low frequency signal, where said steady signal is modulated by the variable signal, and from whence the modulated, high frequency signal is returned to a receptor.

A further object of this invention is to provide a resonant means in the intermixing zone which is exposed to the incoming weak sonic signals on one side thereof, and to the high frequency, strong signal on the other, and wherein modulated high frequency signals are reradiated from said resonant means to a receptor.

A further and an overall object of this invention is to enhance the range and electronic sensitivity of an ultrasonic image tube, so as to enable it to accept low freqency, relatively weak, scatter signals.

Heretofore, high resolution ultrasonic imaging systems have been restricted to the use of relatively high frequencies (above one megahertz) because the requisite image converters employ continuous piezoelectric or piezoceramic image conversion plates which are limited in diameter by factors of physical strength and material availability, and further because resolution is a function of the diameter to wavelength ratio. Attenuation of ultrasonic waves in a liquid such as water increases as the square of the signal frequency. Consequently, the penetration distance at the high frequency suitable for high resolution image detection is limited. This invention provides the advantage that a low frequency signal of high penetration distance can be converted to a high frequency image suitable for detection by known high resolution image converters.

The above and other objects of this invention will be more fully understood from the following description taken in connection with accompanying drawings in which FIG. 1 represents one embodiment of the invention.

FIGS. 2-4 disclose three modifications of the system illustrated in FIG. 1.

FIG. 5 is a detailed view of the waveguide utilized in the embodiment of FIGS. 1 and 2.

Referring to FIG. 1, element 1 is a resonant plate, 2 is an image tube and 3 are converging tapered waveguides which interconnect one side of the resonant plate with the face of the image tube. A low frequency sonic image signal identified by arrows $a$ is accepted by the resonant plate.

Referring to FIG. 5, the tapered waveguides 3 are affixed by compliant gaskets or other suitable means to the resonant plate on the opposite side of the incoming signal and to the face of the image tube 2, and are equipped with ultrasonic signal generators 4, at a suitable point along the lengths thereof, which introduce a high frequency, steady pumping signal into fluid medium 5 within the waveguides. Ultrasonic generators 4 may be of known magnetostrictive or piezoelectric design. Insulated leads 6 connect the ultrasonic generators to an electronic power source (not shown).

The resonant plate 1 is of a type described by Ernst, Journal of Scientific Instruments, vol. 22, pp. 238–43, December 1945, and comprises a solid metallic or plastic plate dimensioned to a resonant thickness, of one quarter wavelength, or an odd multiple thereof, for the low frequency image, or the fractional difference from a quarter wavelength or odd multiple thereof necessary to match the impedance of the medium conveying the low frequency image to that of the waveguides 3.

The signal introduced by the above ultrasonic generators must be of sufficient amplitude so that medium 5 within the waveguides is stressed into the region of significant non-linear compressibility and of sufficiently high frequency for discrete reception by image tube 2.

Considering each incremental area of resonant plate 1 facing the fluid medium within a given waveguide as an individual, discrete resonator, it will be apparent that incoming signals $a$, striking such resonator, will combine with the high frequency pumping signal $b$ introduced by generator 4 and modulate the latter, thereby presenting to the corresponding spot on image tube 2 cross-modulated signals representing the sum or difference of the incoming signal $a$ and the pumping signal $b$, hereafter designated $ab$.

Known image tubes of the type employed in this invention have an optimum response within a given narrow frequency range. Assuming an image tube sensitive to 1.0 mHz., and an incoming signal of 0.25 mHz., the pumping frequency $b$ could be either 0.75 or 1.25 mHz. This would result in acceptance of $b+a$ or $b-a$ frequencies, respectively, by the image tube depending on the resonant frequency of its face plate.

Plate 1 will transmit low frequency image signals only within the resonance bandwidth of the plate. Thus, this embodiment of the invention would be most suitable for the detection of a narrow frequency band image signal such as might arise from the scattering by distant objects of a low frequency sound emitted in the vicinity of the sensor. In this usage, plate 1 would not only couple the desired signal into the waveguides, but would reject noise at other frequencies, thereby improving the signal-to-noise performance of the system.

The sonic resolution of an imaging system is primarily a function of the ratio between its aperture diameter and the sonic wavelength. For a given resolution in an imaging system operating entirely at the original signal frequency, the image tube face diameter must be increased proportionately as signal frequency is reduced to obtain longer range through lower absorption in the transmission medium. Known image tubes, of the type employed in this invention, have practical size limitations which preclude their direct use at low signal frequencies. This difficulty is solved in this invention by converting a low frequency image signal to a high frequency one for which an ultrasonic image tube of practical dimensions has the requisite resolution.

It will be understood that a waveguide would be required for each resolution element to be achieved by the system. For instance, sixty lines of resolution along each coordinate would require 3600 waveguides each interconnecting a discrete area of resonant plate 1 with a corresponding area on the face of image tube 2. Considering the volume of fluid within the tapered waveguides as the cross-modulation zone, it will be obvious that increase in divergence of said waveguides in a direction away from the image tube, whether by way of increase in receiving end area of guides, or by way of wider angular divergence thereof at the receiving end, will increase the frontal area of sensitivity of the system in the plane of resonant plate 1, and will result in capture of a plurality of scattered signals $a$, which would go undetected if applied directly to the face of the image tube, the latter being inherently limited in area.

As shown in FIG. 1, the resonant plate 1 and face of image tube 2 are arranged in parallel planes, but departure from parallelism between these components may be introduced to meet specific conditions, such as correction of lens system abberations.

The image tube 2 which converts ultrasonic signals to electric video data, employed in this system, is of a type disclosed in the inventor's prior U.S. Pat. No. 2,903,617, Sept. 8, 1959, and discussed by him in an article entitled "Ultrasonic Imaging" in Ultrasonics for October–December 1965, pp. 182–187. The specific features of the image tube, be they mechanical or electronic, are not a part of the subject invention.

While the conical waveguide illustrated in FIG. 5 is generally circular in cross section, rectangular or other geometric configurations may be utilized. The waveguide may be constructed as a thin-walled tapered tube, of stainless steel or plastic. Inasmuch as a small degree of non-linear compressibility exists in all fluids, various liquids could be used in the tube, but performance could be improved by selecting a liquid having a large coefficient of non-linearity. Sea water constitutes a very acceptable non-linear compressibility sonic medium, since its non-linearity of compressibility is enhanced by the presence of microbubbles, and air pocketed marine life.

Other waveguide constructions would be applicable for specific application. For instance, the waveguides might be bored in a solid piece of metal which would serve not only to provide a high acoustic impedance around each duct, but also a pressure barrier between an underwater medium and the image tube, so that the image tube can be employed at various, external pressures.

FIG. 2 illustrates a modification utilizing a waveguide cross-modulation zone similar to the first embodiment but omitting resonant plate 1, so that weak image signals $a$ are accepted directly by the waveguides. This embodiment is particularly suitable where the image signal has a wide band frequency characteristic which would be unduly distorted by the resonant plate. Such a sensor might utilize both the sum and difference signals resulting from cross-modulation instead of one of the resultant frequencies as described in the first embodiment of this invention, requiring that the image tube respond to a frequency bandwidth covering both the sum and difference sidebands resulting from the cross-modulation.

FIG. 3 illustrates a further modification of the present invention which dispenses with waveguides 3, as well as resonant plate 1. A low frequency acoustic converging lens 8 is mounted well in front of imaging tube 2. The high frequency pumping generators 4′ are mounted in proximity of the image tube to produce a focused, high frequency outwardly directed ultrasonic wavefront indicated by arrows $b'$. This embodiment entails a basic difference from those illustrated in FIGS. 1 and 2 in that the directions of the carrier or pumping signal, and the low frequency signal are opposed. In the first two embodiments the signal propagation is essentially in the same direction, towards the image tube.

The generators 4′ are of directional type and are structured to form a plane or slightly curved wavefront of high frequency signal $b'$ in the space between low frequency lens 8 and the image tube 2 where intermixing between the incoming and generated signals takes place. The cross-modulation signal $ab$ arising from a signal source in a particular direction, converges to a point of focus at the image tube. Cross-modulation arising from signals of different direction will result in a focus at a different point on the image tube. Thus, the two-dimensional image detected at the image tube will be a derivative of the special directional distribution of signals received by lens 8.

The convergence of the cross-modulation signal to a focus will be a function of not only the converging power of the low frequency lens, but also the curvature of the outwardly propagating pumping or carrier signal introduced by generators 4′.

Successful operation of this sensor, with opposed directions of the pumping and low frequency signals, demands that special additional requirements be placed upon the fluid filling the space between the low frequency lens and the image tube, and to a lesser extent, upon the wavefront curvatures for the signal energy and the pumping energy that are intermixed. These requirements arise from the phase cancellation of the cross-modulation signal arriving at the image tube focal point if the strength of this signal is uniform from all elements of the interaction volume.

In this invention the phase cancellation can be prevented by the introduction of a non-uniform interaction strength through the interaction volume. Among specific approaches are the inclusion of randomly distributed discrete points of non-linearity throughout the volume, the selection of a fluid that substantially attenuates the pumping signal, but not the source signal within the dimensions of the interaction volume, and regulation of the point-to-point pumping signal intensity through shaping of the wavefront. In the first specific approach, an example of a discrete point of non-linearity would be an air pocket contained in a membrane.

A still further embodiment shown in FIG. 4 represents a modification for the case where the propagation medium, itself, the ocean for instance, contains randomly distributed discrete points of non-linearity such as microbubbles, and selectively attenuates the pumping signal, thus meeting the special requirements for preventing phase cancellation of the interaction signal at the image point.

The pumping generators 4′ are placed substantially in the plane of lens 7 in front of image tube 2, while the intermixing zone is located in front of lens 7, in the direction of incoming signal $a$, extending an optimized distance determined by the nature of the signals, propagating medium, and other factors. The lens 7, is now smaller in size and of a form suitable to image the high frequency cross-modulation sidebands. While two pumping generators are illustrated in FIGS. 3 and 4, it will be understood that more or less of them may be mounted substantially in the plane of image tube 2, or lens 7, as may be required to attain a requisite degree of pumping signal distribution in the interaction volume.

The geometries of FIGS. 1 to 4 are to be considered as representative of the system set up; they may be varied within the scope of this disclosure by changing the relative spacing of components 1, 2, 7, 8, 4 and 4′. In the various embodiments, the optimum geometry, relative spacing and location of components will be maintained by suitable framing and supporting structure, not shown in the figures.

Having described the invention by way of the several embodiments, it is to be understood that the same is

What is claimed is:

1. An electronic image tube system for receiving ultrasonic signals comprising an electronic image detecting tube having an acoustically responsive face, a high frequency sonic projector means for generating a steady signal, a nonlinear compressibility sonic medium, a source of incoming signals producing variable signals in said medium to be sensed by the image tube, and means providing an intermixing zone within said medium for parametric modulation of said steady signal by said incoming signals and for reradiating the resultant signals to the face of the image detecting tube.

2. A device according to claim 1 in which a plurality of divergent waveguides are fixed at their converging ends to the face of the image tube, said guides containing non-linear compressibility fluid and said high frequency sonic projecting means, the divergent ends of said waveguides receiving the variable signals from the source to be imaged.

3. A device according to claim 2, which includes a resonant plate to which the diverging ends of the waveguides are fixed, said incoming signals impinging on said resonant plate and being transmitted thereby to the non-linear compressibility fluid within the waveguides.

4. A device according to claim 3 in which the waveguides are hollow tapered elements of uniformly varied geometric cross section, and wherein the said elements are fixed to the face of the image tube at their smallest cross section ends and to the resonant plate at the largest cross section ends.

5. A device according to claim 4 in which the waveguides are of elongated frustoconical configuration.

6. A device taccording to claim 3 in which the areas of the resonant plate opposite each waveguide function as discrete resonant elements.

7. A device according to claim 1, which includes a low frequency focusing lens in front of the image tube, which lens receives the incoming signals and against which the high frequency steady signal is beamed, the volume between said lens and image tube serving as an intermixing zone.

8. A device according to calim 7 in which the sonic projector means is located in proximity of the face of the image tube, and is beamed to provide a spherical ultrasonic wave towards said lens.

9. A device according to claim 1 in which a high frequency lens is provided in front o fthe image tube, and in which the high frequency steady signal means is mounted in proximity of the lens, said signal means providing an outwardly directed wave in front of and spaced from said lens, and wherein the cross-modulation zone lies beyond said lens.

10. A device according to claim 9 in which said lens and signal means lie in substantially the same plane relatively close to the image tube and wherein the high frequency signal means produces a steady signal focused at a more remote location from said image tube.

11. A device according to claim 1 in which the nonlinear compressibility medium within the intermixing zone is sea water.

12. The method of expanding sensitivity and resolution of an ultrasonic responsive, electronic image tube for receiving images through a sonic medium comprising the steps of establishing a cross-modulation zone of non-linear compressibility medium in front of said image tube, accepting variable low frequency signals from without said zone, providing steady high frequency signals within said zone, cross-modulating parametrically said steady and variable signals within said zone, and reradiating the resultant cross-modulated signals to the receiving end of the image tube.

13. The method according to claim 12 wherein the cross-modulation zone of non-linear compressibility medium presents a receiving plane for variable signals which is materially greater in area than the area of the receiving end of the image tube.

14. The method according to claim 13 in which the received signals are scattered and of realtively low frequency, and wherein the steady high frequency signal cross-modulated therewith are beamed to said zone from the proximity of the image tube.

15. The method according to claim 14, wherein the variable frequency signals entering said cross-modulation zone are condensed by an acoustic lens of an area materially greater than the area of the receiving end of the image tube.

16. The method according to clim 14, wherein the reradiated signals are focused by a high frequency acoustic lens in said cross-modulation zone, in front of said image tube.

References Cited

UNITED STATES PATENTS

| 2,581,780 | 1/1952 | Ahier et al. | 332—26 XR |
| 2,711,514 | 6/1955 | Rines | 332—26 XR |
| 2,903,617 | 9/1959 | Turner | 315—12 |
| 2,945,192 | 7/1960 | Syzmanski | 332—26 |
| 2,996,611 | 8/1961 | Stahl | 332—2 XR |
| 3,168,659 | 2/1965 | Bayre et al. | |
| 3,278,771 | 10/1966 | Fry | 340—10 XR |

FOREIGN PATENTS 128,923  8/1948  Australia.

RODNEY D. BENNETT, JR., Primary Examiner

B. L. RIBANDO, Assistant Examiner

U.S. Cl. X.R.

331—155; 332—26; 340—5